(12) United States Patent
Smith et al.

(10) Patent No.: US 10,661,816 B2
(45) Date of Patent: May 26, 2020

(54) SYSTEM AND METHOD FOR LOCOMOTIVE DIAGNOSTICS

(71) Applicant: General Electric Company, Schenectady, NY (US)

(72) Inventors: Mark Douglas Smith, Erie, PA (US); Neeraj Agrawal, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/134,918

(22) Filed: Sep. 18, 2018

(65) Prior Publication Data

US 2019/0016357 A1   Jan. 17, 2019

Related U.S. Application Data

(63) Continuation-in-part of application No. 15/150,896, filed on May 10, 2016, now abandoned.

(51) Int. Cl.
| | | |
|---|---|---|
| *B61L 3/00* | (2006.01) |
| *B60L 3/08* | (2006.01) |
| *H02P 29/024* | (2016.01) |
| *H02P 9/30* | (2006.01) |
| *B60L 50/10* | (2019.01) |
| *B60L 3/00* | (2019.01) |
| *B61L 15/00* | (2006.01) |
| *H02P 9/10* | (2006.01) |
| *B61C 7/04* | (2006.01) |

(Continued)

(52) U.S. Cl.
CPC ............. *B61L 3/008* (2013.01); *B60L 3/0061* (2013.01); *B60L 3/0084* (2013.01); *B60L 3/08* (2013.01); *B60L 50/10* (2019.02); *B61L 15/0081* (2013.01); *H02P 9/10* (2013.01); *H02P 9/302* (2013.01); *H02P 29/0241* (2016.02); *B60L 2200/26* (2013.01); *B60L 2240/421* (2013.01); *B60L 2240/423* (2013.01); *B60L 2240/427* (2013.01); *B60L 2240/429* (2013.01); *B60L 2240/441* (2013.01); *B60L 2240/80* (2013.01); *B61C 7/04* (2013.01); *H02M 3/315* (2013.01); *H02P 2101/45* (2015.01)

(58) Field of Classification Search
CPC .. B61L 3/008; B61L 15/0081; H02P 29/0241; H02P 9/10; H02P 9/302; B60L 50/10; B60L 3/0061; B60L 3/0084; B60L 3/08
See application file for complete search history.

(56) References Cited

U.S. PATENT DOCUMENTS

| | | | | |
|---|---|---|---|---|
| 4,339,704 A | * | 7/1982 | McSparran | H02M 7/08 322/90 |
| 7,514,807 B2 | * | 4/2009 | Donnelly | B60L 7/06 290/400 |

(Continued)

*Primary Examiner* — Viet P Nguyen
(74) *Attorney, Agent, or Firm* — Buckley, Maschoff & Talwalkar LLC

(57) ABSTRACT

A vehicle includes an engine and alternator having a field coil and a plurality of output windings, a field current controller configured to receive an AC input and convert the AC input into a regulated DC output that is supplied to the field coil of the alternator, and a controller configured to monitor at least one operating parameter of the field current controller and to compare a monitored value of the at least one operating parameter to a threshold range.

17 Claims, 3 Drawing Sheets

(51) Int. Cl.
    *H02M 3/315*        (2006.01)
    *H02P 101/45*       (2016.01)

(56) References Cited

U.S. PATENT DOCUMENTS

2007/0228735 A1* 10/2007 Becker .................... F02D 29/06
                                                        290/400
2007/0252561 A1* 11/2007 Gvelesiani .............. B60L 15/20
                                                         322/45
2008/0246338 A1* 10/2008 Donnelly .................. B61C 7/04
                                                         307/54

* cited by examiner

SYSTEM AND METHOD FOR LOCOMOTIVE DIAGNOSTICS

TECHNICAL FIELD

Embodiments of the invention relate generally to rail vehicles. Certain embodiments relate to systems and methods for diagnosing the health of components of the rail vehicle and, in particular, for predicting impending failures in an alternator of the rail vehicle.

BACKGROUND

Vehicles such as locomotives and other off-highway vehicles ("OHVs") employ complex electromechanical systems comprised of several complex subsystems. Each of these subsystems is built from components which can, over time, fail. The ability to automatically predict failures before they occur in such subsystems is desirable for several reasons. For example, in the case of locomotives, that ability is important for reducing the occurrence of primary failures which result in stoppage of cargo and passenger transportation. These failures can be very expensive in terms of lost revenue due to delayed cargo delivery, lost productivity of passengers, other trains delayed due to the failed one, and expensive on-site repair of the failed locomotive. Further, some of those primary failures could result in secondary failures that in turn damage other subsystems and/or components. It will be further appreciated that the ability to predict failures before they occur would allow for conducting condition-based maintenance, that is, maintenance conveniently scheduled at the most appropriate time based on statistically and probabilistically meaningful information, as opposed to maintenance performed regardless of the actual condition of the subsystems, such as would be the case if the maintenance is routinely performed independently of whether the subsystem actually needs the maintenance or not. Needless to say, a condition-based maintenance is believed to result in a more economically efficient operation and maintenance of the locomotive due to substantially large savings in cost. Further, such type of proactive and high-quality maintenance will create an immeasurable, but very real, good will generated due to increased customer satisfaction. For example, each customer is likely to experience improved transportation and maintenance operations that are even more efficiently and reliably conducted while keeping costs affordable, since a condition-based maintenance of the locomotive will simultaneously result in lowering maintenance cost and improving locomotive reliability.

Previous attempts to overcome the above-mentioned issues have been generally limited to diagnostics after a problem has occurred, as opposed to prognostics, that is, predicting a failure prior to its occurrence. For example, previous attempts to diagnose problems occurring in a locomotive and other vehicles have been performed by experienced personnel who have in-depth individual training and experience in working with locomotives. Typically, these experienced individuals use available information that has been recorded in a log. Looking through the log, the experienced individuals use their accumulated experience and training in mapping incidents occurring in locomotive subsystems to problems that may be causing the incidents. If the incident-problem scenario is simple, then this approach works fairly well for diagnosing problems. However, if the incident-problem scenario is complex, then it is very difficult to diagnose and correct any failures associated with the incident and much less to predict or anticipate the problems before they occur.

In view of the above-mentioned considerations, there is a need to be able to quickly and efficiently predict failures before such failures occur in certain vehicle subsystems and/or components, while minimizing the need for human interaction and optimizing the repair and maintenance needs of the subsystem so as to able to take corrective action before any actual failure occurs.

BRIEF DESCRIPTION

In an embodiment, a system (e.g., for controlling a device responsive to detecting incipient faults in an alternator) includes an alternator having a field coil and a plurality of output windings, a field current controller configured to receive an AC input and convert the AC input into a regulated DC output that is supplied to the field coil of the alternator, and a controller configured to monitor at least one operating parameter of the field current controller and to compare a monitored value of the at least one operating parameter to a threshold range.

In another embodiment, a control method for an alternator (e.g., control based on detecting incipient faults in the alternator) includes the steps of monitoring at least one operating parameter of a field current controller of an alternator, comparing a determined value of the at least one operating parameter to a threshold range for the at least one operating parameter, and generating a controls signal if the determined value falls outside of the threshold range for the at least one operating parameter.

In yet another embodiment, a system is provided. The system includes an alternator having a field coil and a plurality of output windings, an alternator control device configured to receive an AC input and to convert the AC input into a regulated DC output that is supplied to the field coil of the alternator, and a controller configured to monitor at least one operating parameter of the alternator control device. The controller is configured to generate a control signal if a value for the at least one operating parameter of the alternator control device exceeds a threshold value.

DRAWINGS

The present invention will be better understood from reading the following description of non-limiting embodiments, with reference to the attached drawings, wherein below:

DETAILED DESCRIPTION

Figure 1:
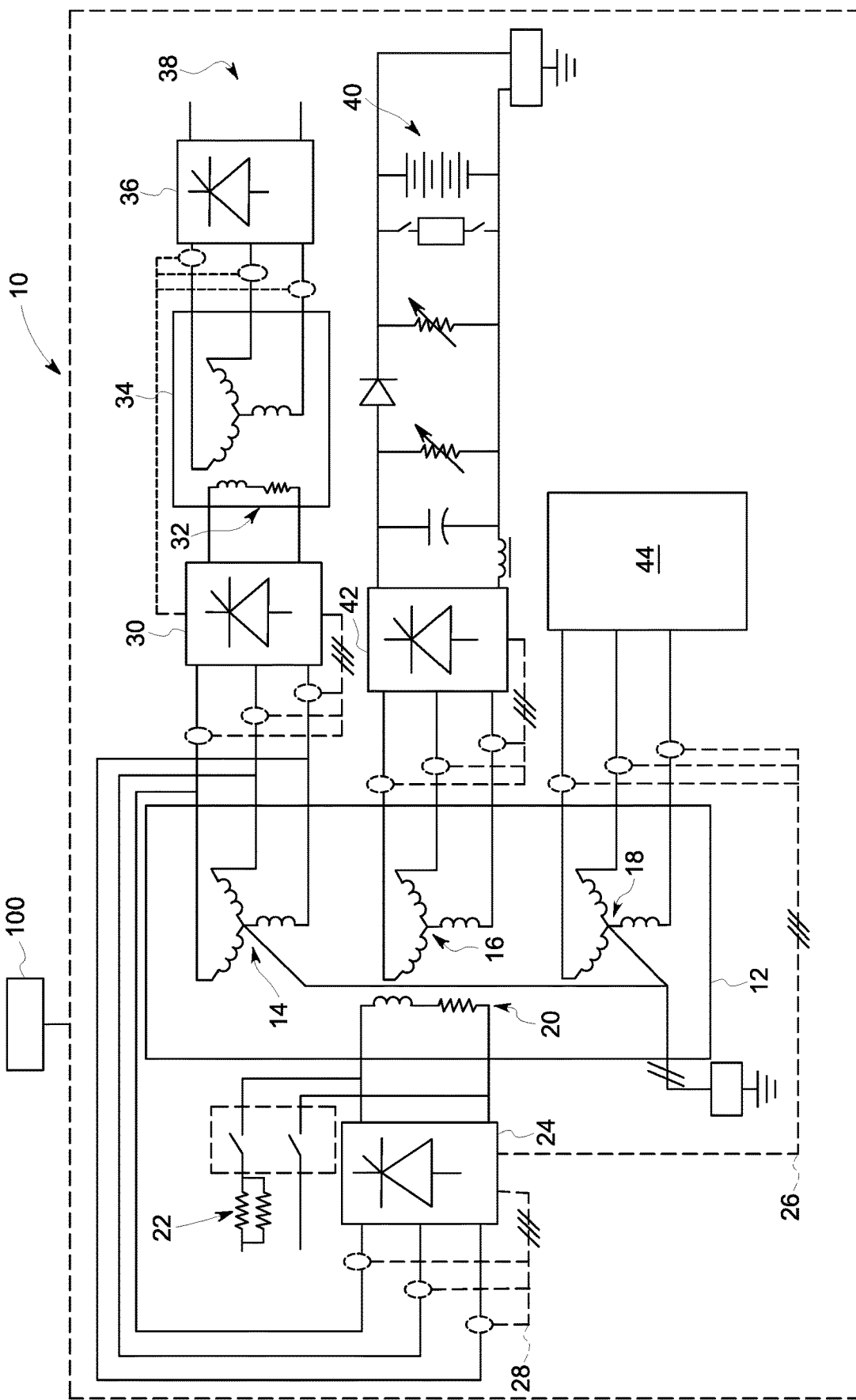
FIG. 1 is a functional block diagram of an auxiliary system of a vehicle, according to an embodiment of the invention.

Reference will be made below in detail to exemplary embodiments of the invention, examples of which are illustrated in the accompanying drawings. Wherever possible, the same reference characters used throughout the drawings refer to the same or like parts.

Embodiments of the invention relate generally to vehicle systems and components. Certain embodiments relate to systems and methods for predicting impending failures in vehicle systems and components. In one embodiment, a system for detecting incipient faults in an alternator includes an alternator having a field coil and a plurality of output windings, a field current controller configured to receive an AC input and convert the AC input into a regulated DC output that is supplied to a field coil of the alternator, and a controller configured to monitor at least one operating parameter of the field current controller and to compare a monitored value of the at least one operating parameter to a threshold range. Comparison of the monitored value to the threshold range may reveal whether or not incipient faults are present in the alternator, which may be evidence of impending alternator failure. In a particular embodiment, the alternator and field current controller may integrated into the same device.

FIG. 1 schematically illustrates an exemplary auxiliary system 10 for an electric drive machine such as a locomotive, other OHV, or other vehicle. The auxiliary system 10 includes an alternator 12 mechanically coupled to, and driven by, an engine (e.g., a diesel engine, a gasoline engine, a multi-fuel engine, etc.) (not shown). In an embodiment, the alternator 12 is a three-phase alternator having a plurality of output windings, for example, an excitation winding 14, a battery winding 16 and a motor winding 18. The alternator 12 is configured to convert the mechanical, rotational output of the engine into electrical energy in the form of alternating current for recharging batteries, powering traction motors, and powering other auxiliary electric motors of the electric drive machine, as discussed in detail hereinafter.

Figure 2:
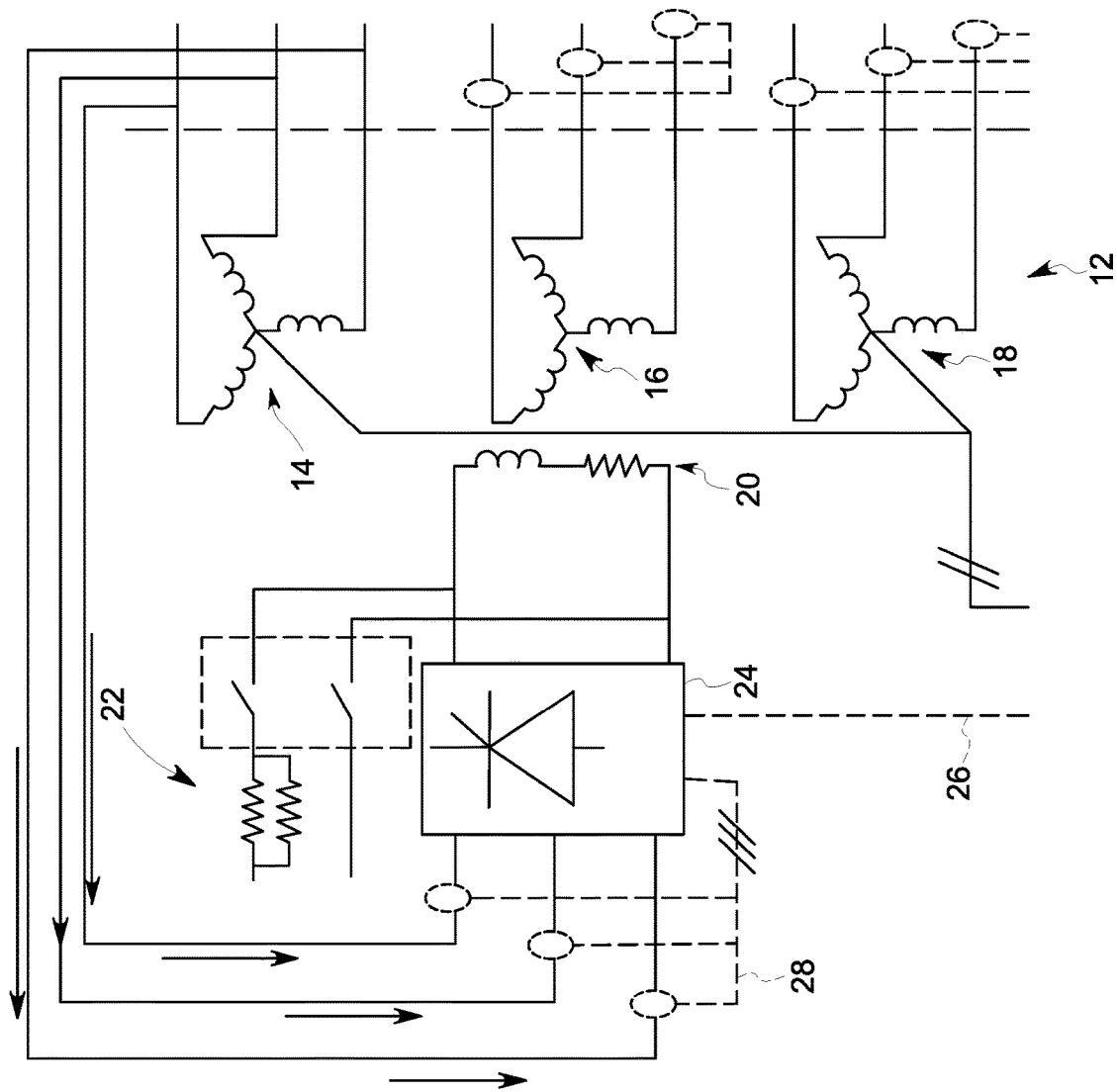
FIG. 2 is a detail view of a portion of the auxiliary system of FIG. 1.

As further illustrated in FIG. 1, the auxiliary system 10 includes a field coil 20 that supplies field current to the alternator 12. During startup, a battery 22 may supply the initial current to the field coil 20 for initial alternator operation. During operation, however, the alternator is self-sustaining. In particular, as illustrated in FIG. 2, the excitation output winding 14 of the alternator 12 produces a three-phase alternating current output, which is supplied as a three-phase AC input to an alternator control device 24. The alternator control device 24 is configured to convert the three-phase AC input into a regulated DC output. This DC output is supplied to the field coil 20 to excite the stator of the alternator 12 and provide the three separate, three phase outputs 14, 16, 18 for various vehicle or machine functions. The DC output is regulated by the alternator control device 24 by utilizing various voltage and current feedbacks from the three alternator output windings 14, 16, 18. As illustrated in FIGS. 1 and 2, the feedbacks may include, for example, motor winding and voltage feedbacks 26 and alternator control device input voltage and current feedbacks 28.

In an embodiment, as best illustrated in FIG. 2, the alternator control device 24 includes a plurality of silicon controlled rectifiers (SCRs) or thyristors that convert the AC input into the regulated DC output. The DC output of the alternator field coil 20 is controlled by the percentage the SCRs or thyristors of the alternator control device 24 are turned on in relationship to the phase angle of the AC input voltage. This parameter is defined herein as the "percent ON" of the alternator control device 24. As discussed in detail hereinafter, by monitoring the stability of the percent ON of the alternator control device 24, the health or integrity of the alternator 12 can be determined.

As further shown in FIG. 1, in an embodiment, the three-phase AC output of the excitation winding 14 may be utilized to power traction motors of the vehicle on which the system 10 is deployed. For example, the AC output of the excitation winding 14 may be provided to a traction control device 30 having, like alternator control device 24, a plurality of SCRs or thyristors. The traction control device 30 is configured to convert the three-phase AC input (from the excitation winding 14) into a regulated DC output that is provided to a field coil/field winding 32 of a traction alternator 34. In particular, this DC output is supplied to the field coil 32 to excite the stator of the traction alternator 34, which provides three separate three phase outputs to a traction rectifier 36.

The traction alternator 34 is configured to provide AC electric power to one or more rectifiers (e.g., rectifier 36), which are electrically connected to one or more power converters (not shown). The power converters may be connected to, for example, first and second traction motors (not shown) associated with first and second wheels of the vehicle on which the system 10 is deployed, respectively. As is known in the art, the rectifier 36 is configured to convert the AC power received from the traction alternator 34 into a DC output which is then fed to the power converters through a traction bus 38. The power converters are configured to supply three-phase, variable frequency AC power to the traction motors associated with the first and second wheels of the vehicle (typically the rear wheels of the vehicle). While the rectifier 36 is illustrated as being separate from the traction alternator 34, in certain embodiments, the rectifier may form a part of the alternator 34, as is known in the art. In an embodiment, the traction bus 38 is 1000-1500 VDC bus.

As further illustrated in FIG. 1, in an embodiment, the three-phase AC output of the battery winding 16 may be utilized to recharge one or more batteries 40 of the machine or vehicle on which the system 10 is deployed, under control of a battery control device 42. In particular, the battery control device 42 is configured to regulate the output voltage and current to charge batteries 40. In an embodiment, the battery control device 42 may be configured similarly to the control devices 24, 30 and operate in a similar manner.

In addition, the three-phase AC output of the motor winding 18 may be utilized to power one or more auxiliary motor loads 44. In particular, as shown in FIG. 1, the three-phase AC output of the motor winding 18 may be provided directly to one or more AC motors such as, for example, motors associate with auxiliary systems or components. In an embodiment, the motor loads 44 may include one or more of a compressor, an alternator, a blower, and air-to-air fan, a radiator fan, other cooling fans, a traction motor blower, etc.

As shown in FIG. 1, in an embodiment, the auxiliary system 10 may be electrically coupled to (so as to be in communication with) and controlled by, an on-board controller 100. In an embodiment, the controller 100 may be a master control unit for the vehicle that is configured to control overall operation of the vehicle and the various systems and components on-board the vehicle.

In connection with the above, the auxiliary alternator 12, as well as the main traction alternator 32, are critical components of the auxiliary system 10 deployed on a machine, locomotive, OHV or other vehicle. In particular, as described above, the alternator 12 may provide all the electrical power necessary to propel the vehicle, charge vehicle batteries, and power auxiliary devices such as cooling fans and the like. Accordingly, due to the fact that so many components and systems draw upon the alternator 12 for their own operation, failure of the alternator 12 may often result of stoppage of the entire vehicle or machine on which the alternator 12 is deployed. These unplanned stoppages can be very expensive in terms of lost revenue due to, for example, delayed cargo delivery, lost productivity of passengers, and expensive on-site repair or replacement of the failed alternator.

In order to substantially obviate such unplanned stoppages due to alternator failure, the system 10 of the present invention is configured to detect incipient faults in the alternator 12. By detecting such faults at an early stage, i.e., before failure of the alternator 12, the machine or vehicle can be scheduled for a planned service, at which time the alternator 12 may be repaired or replaced (rather than having to replace the alternator 12 in the field, after failure). In an embodiment, the controller 100 of the system 10 is configured to detect incipient faults in the alternator 12 by monitoring the percent ON of the alternator control device 24, as discussed hereinafter.

As indicated, the alternator control device/field current controller 24 continuously adjusts the firing of the controlled rectifier devices (e.g., the SCRs or thyristors) to regulate the generated voltage. An inter-turn fault in the alternator 12, however, reduces the instantaneous voltage generated at the output terminals of the alternator 12 for a given field current and speed. In response, the alternator control device 24 moves a reference command in order to compensate for the instantaneous voltage loss, and such reference command settles at a different value due to the permanent nature of the voltage loss. The duty-cycle of the controlled rectifier devices of the alternator control device 24 also changes and settles down at a higher value than during normal operation. By monitoring this duty-cycle signal (i.e., the switching patterns of the SCR or thyristors of the alternator control device 24) and comparing it against a corresponding duty-cycle signal during healthy alternator operation, inter-turn faults in the alternator may be detected before the alternator fails.

In particular, when there is some insipient fault in the windings of the alternator 12, it causes a short circuit, which in turn reduces the number of turns in such windings. Because the vehicle in which the system 10 is embodied runs on a constant voltage/frequency ratio, to maintain constant voltage at a constant engine speed, the alternator 12 requires more field current from the field coil 20. The field current controller 24 continuously adjusts the firing of the controlled rectifier devices (e.g., the SCRs or thyristors) to regulate the generated voltage.

As indicated above, the field current is directly controlled by the percent ON (also referred to as ON time) of the thyristors or SCRs of the alternator/field current control device 24. By measuring or monitoring the percent ON (or duty-cycle) of the field current control device 24, and then comparing this to the percent ON of the field current control device 24 under normal conditions (i.e., where it is known that there are no incipient faults in the alternator 12), alternator failure due to inter-turn winding faults can be predicted in advance. In particular, if the comparison reveals a difference in the percent ON of the alternator control device 24 outside of a predetermined range, or in excess of a predetermined 'normal' value, then this may be evidence that an incipient inter-turn fault may be present in the alternator 12. As discussed above, percent ON is the amount that the SCRs or thyristors of the alternator control device 24 are turned on in relation to the phase angle of the AC input voltage to the alternator control device 24.

In the event that an incipient fault is detected, this fact may be communicated to an operator of the vehicle such as, for example, through a visual or audio alert or notification. Alternatively, or in addition to notifying an operator, the detection of the incipient fault may be communicated to remote monitoring equipment so that maintenance may be scheduled to repair or replace the alternator 12. In addition, the controller is configured to control at least one of the alternator, the field current controller, or a vehicle in which the alternator is disposed responsive to one of: the at least one operating parameter falling outside of the threshold range; or receipt of a signal from a remote monitoring system that is sent to the controller responsive to the controller sending a notification to the remote monitoring system of the at least one operating parameter falling outside of the threshold range.

In an embodiment, the SCRs or thyristors of the alternator control device 24 operate between 0 percent and 100 percent. During normal operation (i.e., when there are no faults in the alternator 12), the percent ON of the alternator control device 24 is between approximately 15 percent and 40 percent (defining a normal operating range). Accordingly, in an embodiment, the controller 100 may be configured to generate an alert or notification to indicate an incipient fault in the alternator 12 when the percent ON of the alternator control device 24 is outside of this normal operating range (i.e., greater than 40 percent or less than 15 percent). In an embodiment, the controller 100 may be configured to generate an alert or notification when the percent ON of the alternator control device 24 is greater than approximately 40 percent.

Figure 3:
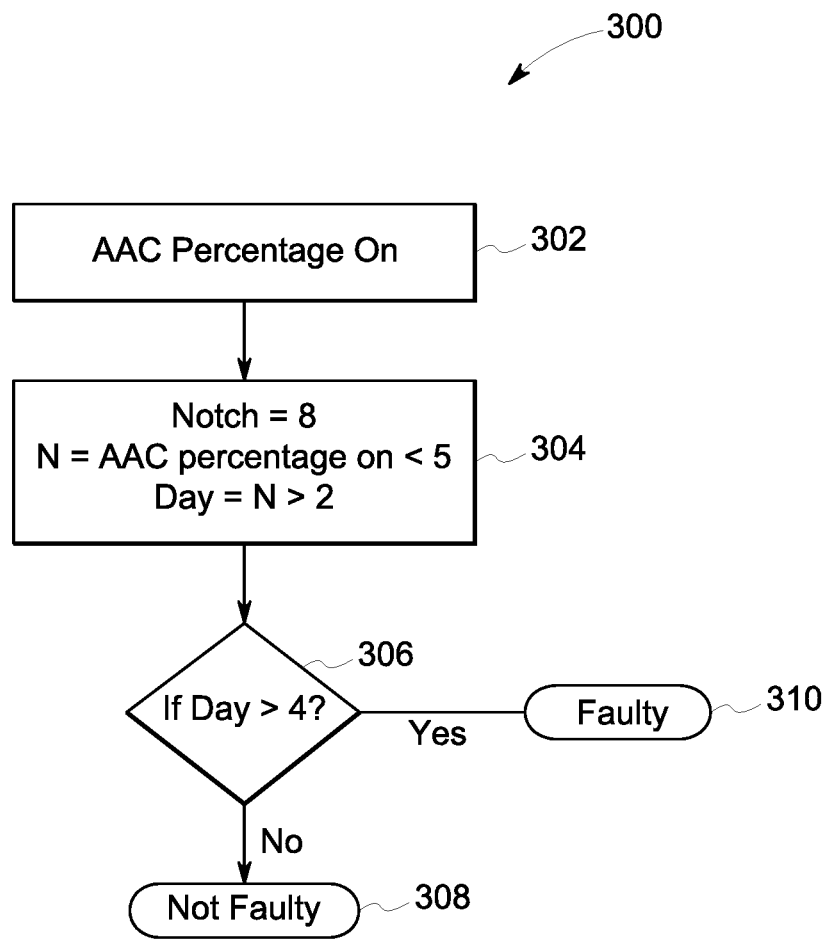
FIG. 3 is a flowchart illustrating a control method for an alternator, according to an embodiment of the invention.

Turning now to FIG. 3, an exemplary control routine 300 utilized by the controller 100 for determining an incipient fault in an alternator of a vehicle is illustrated. As discussed above, at step 302 the controller 100 monitors the percent ON of the field current controller 24 of the alternator 12. In an embodiment, the field current controller is monitored when the vehicle is in a designated operational state, that is, an operational state that is designated for testing or diagnosing the alternator and/or field current controller. Thus, the controller may be configured to control the vehicle to the designated operational state prior to monitoring the field current controller, and/or the controller may be configured to monitor the field current controller responsive to the vehicle operating in the designated operational state. In one aspect, the designated operational state is a designated throttle level of the vehicle. If the vehicle is a locomotive or other rail vehicle, the designated throttle level may be a designated notch level of the rail vehicle (notch referring to discrete throttle levels from zero/idle to eight/max, or the like, where the rail vehicle only operates in the discrete throttle levels). For example, where the vehicle is a locomotive or other rail vehicle, the percent ON may be monitored when the rail vehicle is operating at notch 8, or the rail vehicle may be specifically controlled to notch 8 (or another designated notch level) for monitoring purposes. At step 304, the determined percent ON is compared to a predetermined percent ON range for normal alternator operation. For example, as shown therein, if the determined percent ON is less than 5 percent ON, and this has been present for more than a preset duration (e.g., 2 days), then the controller moves on to step 306. At step 306, if the percent ON of the field current controller 24 has been below 5 percent for less than 4 days, then a "NOT FAULTY" determination is made at 308. Alternatively, if the percent ON of the field current controller has been below 5 percent for more than 4 days, then a "FAULT" determination is made at 310, at which time an alert or notification may be generated so that corrective action may be taken in advance of the alternator 12 actually failing.

In an embodiment, the controller is configured to automatically control the vehicle to the designated operational state independent of operations of the vehicle for traveling along a route (e.g., either when the vehicle is not traveling, or in a way that does not interfere with travel beyond acceptable tolerances). For example, in one aspect the controller is configured to monitor the field current controller when the vehicle happens to be operating in the designated operation mode, e.g., while traveling along a route. In another aspect, the controller is additionally or alternatively configured to control the vehicle to the designated operational mode specifically for testing/diagnosing the field current controller, separate from the vehicle being controlled for travel. For example, the vehicle may be controlled to the designated operational mode when parked, or when traveling but in a way that does not interfere with the travel (e.g., instead of operating at notch 7, operating at notch 6 for a time and then operating at notch 8, to arrive at the same overall throttle on average while still achieving the designated operational state of notch 8).

In an embodiment, the normal percent ON range of the field current controller 24 may be determined by the controller 100 or input by an operator. In addition, in an embodiment, the time period threshold utilized in step 306 may be determined by the controller 100 based upon average time to failure after incipient fault detection values, or may be manually input by an operator.

While the system and method of the present invention have been discussed above in connection with detecting incipient faults in the auxiliary alternator 12, the method may be utilized to detect incipient faults in the main traction alternator 34 that supplies power to the AC traction motors of the vehicle. In particular, the percent ON of the field current control device 30 may be monitored and compared against a normal duty cycle to determine deviations or departures therefrom, which may indicate an impending alternator failure. While the field current control devices 24, 30 have been shown and described herein as being separate components from the alternators 24, 34, respectively, in an embodiment, the field current control devices may be integrated into the respective alternators.

The system and method of the present invention are therefore configured to solve the problem of unscheduled required maintenance of locomotives or other vehicles and machines caused by alternator failure. In particular, the system and method of the present invention allows for the detection of incipient faults in an auxiliary or main traction alternator at least 10 days in advance of an impending failure. As a result, the reliability of the locomotive (or other vehicle or machinery) may be increased and mission failure can be avoided to agree that has heretofore not been possible.

In an embodiment, a system (e.g., for controlling a device responsive to detecting incipient faults in an alternator) includes an alternator having a field coil and a plurality of output windings, a field current controller configured to receive an AC input and convert the AC input into a regulated DC output that is supplied to the field coil of the alternator, and a controller configured to monitor at least one operating parameter of the field current controller and to compare a monitored value of the at least one operating parameter to a threshold range. In an embodiment, the controller is configured to generate a notification if the monitored value of the at least one operating parameter falls outside of the threshold range for the at least one operating parameter. In an embodiment, the threshold range is established in dependence upon normal operation of the alternator. In an embodiment, the at least one operating parameter is a duty-cycle of the field current controller, and the threshold range is a duty-cycle range of the field current controller established during normal operation of the alternator. In an embodiment, the field current controller includes at least one thyristor. In an embodiment, the at least one operating parameter is a switching pattern of the at least one thyristor of the field current controller. In this embodiment, the controller is configured to compare the switching pattern of the at least one thyristor to a switching pattern of the at least one thyristor established during normal operation of the alternator. In an embodiment, the at least one parameter is a percent of time the least one thyristor of the field current controller is turned on (e.g., a percentage of time the least one thyristor of the field current controller is turned on during a time period when the field current controller and/or the alternator is operational).

In an embodiment, the threshold range is approximately 5 percent turned on to approximately 40 percent turned on. In an embodiment, the at least one thyristor is a silicon controlled rectifier. In an embodiment, the alternator is a main traction alternator of a vehicle. In an embodiment, the alternator is an auxiliary alternator of a vehicle. In an embodiment, the notification includes at least one of a visual alert, an audible alarm and a notification to a remote monitoring system. In an embodiment, the controller is configured to control at least one of the alternator, the field current controller, or a vehicle in which the alternator is disposed responsive to one of: the at least one operating parameter falling outside of the threshold range; or receipt of a signal from a remote monitoring system that is sent to the controller responsive to the controller sending a notification to the remote monitoring system of the at least one operating parameter falling outside of the threshold range.

In another embodiment, a control method for an alternator (e.g., based on detecting incipient faults in the alternator) includes the steps of monitoring at least one operating parameter of a field current controller of an alternator, comparing a determined value of the at least one operating parameter to a threshold range for the at least one operating parameter, and generating a controls signal if the determined value falls outside of the threshold range for the at least one operating parameter. In an embodiment, the control signal is configured to control at least one of the field current controller, the alternator, a vehicle in which the alternator is deployed, a communication device, or a notification device. In an embodiment, the method may also include the step of establishing the threshold range for the at least one operating parameter in dependence upon normal operation of the alternator. In an embodiment, the at least one operating parameter is a duty-cycle of the field current controller, and the threshold range is a duty-cycle range of the field current controller established during normal operation of the alternator. In an embodiment, the field current controller includes at least one thyristor, and the at least one operating parameter is a switching pattern of the at least one thyristor of the field current controller. Comparing the determined value to the threshold range may include comparing the switching pattern of the at least one thyristor to a switching pattern of the at least one thyristor established during normal operation of the alternator. In an embodiment, the field current controller includes at least one thyristor or controlled rectifier device, and the at least one parameter is a percent of time the least one thyristor or controlled rectifier device of the field current controller is turned on. In an embodiment, the threshold range is approximately 5 percent turned on to approximately 40 percent turned on. In an embodiment, the control signal is configured to control at least one of: the notification device for generating a visual alert on-board a vehicle on which the alternator is deployed or generating an audible alert on-board the vehicle on which the alternator is deployed; or the communication device for transmitting a message to a remote monitoring system for the vehicle.

In yet another embodiment, a system is provided. The system includes an alternator having a field coil and a plurality of output windings, an alternator control device configured to receive an AC input and to convert the AC input into a regulated DC output that is supplied to the field coil of the alternator, and a controller configured to monitor at least one operating parameter of the alternator control device. The controller is configured to generate a control signal if a value for the at least one operating parameter of the alternator control device exceeds a threshold value. In an embodiment, the alternator control device includes a controlled rectifier device, and the at least one operating parameter is a percent of time the controlled rectifier device is turned on. In an embodiment, the threshold value for the at least one operating parameter is approximately 40 percent turned on.

While embodiments of the invention are suitable for use with both mobile and stationary implementations, for ease of explanation a mobile implementation is described in detail herein. More specifically, a locomotive has been selected for clarity of illustration for the disclosure of mobile embodiments. Other suitable vehicles include, for example, on-road vehicles, locomotives, construction equipment, industrial equipment, and marine vessels. As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily being a mechanical attachment.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:
1. A rail vehicle comprising:
an engine;
an alternator configured to be driven by the engine, the alternator having a field coil and a plurality of output windings;
a field current controller configured to receive an AC input and convert the AC input into a regulated DC output that is supplied to the field coil of the alternator; and
a controller configured to:
control the rail vehicle to a designated operational state, the designated operational state being designated for diagnosing or testing the alternator and field current controller, wherein the designated operational state is a designated throttle level of the rail vehicle; and
responsive to the rail vehicle operating in the designated operational state, monitor at least one operating parameter of the field current controller and compare a monitored value of the at least one operating parameter to a threshold range, wherein the threshold range is a duty-cycle range of the field current controller established during normal operation of the alternator and wherein the at least one operating parameter is a field current controller duty-cycle of the field current controller in operation when the rail vehicle is operating in the designated operational state.

2. The rail vehicle of claim 1, wherein the designated throttle level is a designated notch level of the rail vehicle.

3. The rail vehicle of claim 2, wherein the designated notch level is notch 8.

4. The rail vehicle of claim 1, wherein the controller is configured to automatically control the rail vehicle to the designated operational state independent of operations of the rail vehicle for traveling along a route.

5. The rail vehicle of claim 1, wherein the alternator is a main traction alternator of the rail vehicle.

6. The rail vehicle of claim 1, wherein the alternator is an auxiliary alternator of the rail vehicle.

7. The rail vehicle of claim 1, wherein:
the controller is configured to control at least one of the alternator, the field current controller, or propulsion or navigation of the rail vehicle responsive to one of: the at least one operating parameter falling outside of the threshold range; or receipt of a signal from a remote monitoring system that is sent to the controller responsive to the controller sending a notification to the remote monitoring system of the at least one operating parameter falling outside of the threshold range.

8. The rail vehicle of claim 1, wherein the controller is configured to generate a notification if the monitored value of the at least one operating parameter falls outside of the threshold range for the at least one operating parameter.

9. The rail vehicle of claim 8, wherein the threshold range is established in dependence upon normal operation of the alternator.

10. The rail vehicle of claim 8, wherein the notification includes at least one of a visual alert, an audible alarm, or a notification to a remote monitoring system.

11. The rail vehicle of claim 8, wherein the field current controller includes at least one thyristor.

12. A rail vehicle comprising:
an engine;
an alternator configured to be driven by the engine, the alternator having a field coil and a plurality of output windings;
a field current controller configured to receive an AC input and convert the AC input into a regulated DC output that is supplied to the field coil of the alternator, wherein the field current controller includes at least one controlled rectifier device; and a controller configured to:

control the rail vehicle to a designated operational state, the designated operational state being designated for diagnosing or testing the alternator and field current controller and wherein the designated operational state is a designated throttle level of the rail vehicle; and responsive to the rail vehicle operating in the designated operational state, monitor at least one operating parameter of the field current controller and compare a monitored value of the at least one operating parameter to a threshold range, wherein the threshold range is a duty-cycle range of the field current controller established during normal operation of the alternator, wherein the at least one operating parameter is a switching pattern of the at least one controlled rectifier device of the field current controller when the vehicle is operating in the designated operational state; and wherein the controller is further configured to compare the switching pattern of the at least one controlled rectifier device when the rail vehicle is operating in the designated operational state to a switching pattern of the at least one controlled rectifier device established during normal operation of the alternator.

13. The rail vehicle of claim 12, wherein the designated throttle level is a designated notch level of the rail vehicle.

14. The rail vehicle of claim 13, wherein the designated notch level is notch 8.

15. The rail vehicle of claim 12, wherein the controller is configured to automatically control the rail vehicle to the designated operational state independent of operations of the rail vehicle for traveling along a route.

16. The rail vehicle of claim 12, wherein the at least one controlled rectifier device comprises at least one thyristor.

17. The rail vehicle of claim 12, wherein a duty-cycle of the field current controller is a percent of time the least one controlled rectifier device of the field current controller is turned on.

* * * * *